(12) United States Patent
Haugh et al.

(10) Patent No.: US 9,645,764 B2
(45) Date of Patent: *May 9, 2017

(54) TECHNIQUES FOR MIGRATING ACTIVE I/O CONNECTIONS WITH MIGRATING SERVERS AND CLIENTS

(71) Applicant: INTERNATIONAL BUSINESS MACHINES CORPORATION, Armonk, NY (US)

(72) Inventors: Julianne F. Haugh, Austin, TX (US); Gerald F. McBrearty, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 190 days.

This patent is subject to a terminal disclaimer.

(21) Appl. No.: 14/510,983

(22) Filed: Oct. 9, 2014

(65) Prior Publication Data

US 2015/0026371 A1 Jan. 22, 2015

Related U.S. Application Data

(63) Continuation of application No. 13/450,633, filed on Apr. 19, 2012, now Pat. No. 8,898,224, and a (Continued)

(51) Int. Cl.
*G06F 3/06* (2006.01)
*G06F 9/50* (2006.01)
*H04L 29/08* (2006.01)

(52) U.S. Cl.
CPC .......... *G06F 3/0655* (2013.01); *G06F 3/0604* (2013.01); *G06F 3/067* (2013.01);
(Continued)

(58) Field of Classification Search
CPC ...... G06F 3/0604; G06F 3/0655; G06F 3/067; G06F 9/5077; H04L 67/1002; H04L 67/1097
See application file for complete search history.

(56) References Cited

U.S. PATENT DOCUMENTS 5,950,011 A  9/1999 Albrecht et al.
6,931,441 B1  8/2005 Roden et al.
(Continued)

OTHER PUBLICATIONS

U.S. Appl. No. 12/872,077 entitled "TTechniques for Migrating Active I/O Connections with Migrating Servers and Clients"; Non-final office action dated Aug. 31, 2012 (18 pg).
(Continued)

*Primary Examiner* — Eric Oberly
(74) *Attorney, Agent, or Firm* — Michael R. Long; William Stock

(57) ABSTRACT

A technique for modifying an input/output (I/O) connection type between a client and a server includes determining, by the client, when at least partial storage access control for the client is to be migrated from a first virtualized I/O server to a second virtualized I/O server. An I/O connection type, from among multiple available I/O connection types available between the client and the second virtualized I/O server, is then selected by the client when the at least partial storage access control for the client is to be migrated. The selected I/O connection type is then communicated, by the client, to the second virtualized I/O server, which is configured to facilitate storage access for the client using the selected I/O connection type.

14 Claims, 4 Drawing Sheets

Related U.S. Application Data continuation of application No. 12/872,077, filed on Aug. 31, 2010, now abandoned.

(52) U.S. Cl.
CPC ........ G06F 9/5077 (2013.01); H04L 67/1002 (2013.01); H04L 67/1097 (2013.01)

(56) References Cited

U.S. PATENT DOCUMENTS

| | | | |
|---|---|---|---|
| 6,976,103 B1 | 12/2005 | Watanabe et al. | |
| 7,219,096 B2 | 5/2007 | Haugh | |
| 8,898,224 B2 | 11/2014 | Haugh et al. | |
| 2005/0228835 A1* | 10/2005 | Roa | G06F 3/0605 |
| 2007/0220121 A1* | 9/2007 | Suwarna | G06F 9/4856 709/220 |
| 2009/0216880 A1 | 8/2009 | Lepeska et al. | |
| 2009/0248870 A1* | 10/2009 | Kamei | H04L 67/06 709/225 |
| 2010/0125712 A1* | 5/2010 | Murase | G06F 11/1458 711/162 |

OTHER PUBLICATIONS

U.S. Appl. No. 12/872,077 entitled "TTechniques for Migrating Active I/O Connections with Migrating Servers and Clients"; Non-final office action dated Dec. 24, 2012 (16 pg).

U.S. Appl. No. 12/872,077 entitled "TTechniques for Migrating Active I/O Connections with Migrating Servers and Clients"; final office action dated Aug. 16, 2013 (20 pg).

U.S. Appl. No. 13/450,633 entitled "Migrating Active I/O Connections With Migrating Servers and Clients" non-final office action dated Aug. 31, 2012 (12 pg).

U.S. Appl. No. 13/450,633 entitled "Migrating Active I/O Connections With Migrating Servers and Clients" non-final office action dated Mar. 29, 2013 (13 pg).

U.S. Appl. No. 13/450,633 entitled "Migrating Active I/O Connections With Migrating Servers and Clients" Final office action dated Sep. 13, 2013 (19 pg).

U.S. Appl. No. 13/450,633 entitled "Migrating Active I/O Connections With Migrating Servers and Clients" Notice of Allowance date Jul. 15, 2014 (5 pg).

\* cited by examiner

TECHNIQUES FOR MIGRATING ACTIVE I/O CONNECTIONS WITH MIGRATING SERVERS AND CLIENTS

This application is a continuation of U.S. patent application Ser. No. 13/450,633 entitled "MIGRATING ACTIVE I/O CONNECTIONS WITH MIGRATING SERVERS AND CLIENTS," by Julianne F. Haugh et al., filed on Apr. 19, 2012, which is a continuation of U.S. patent application Ser. No. 12/872,077 entitled "TECHNIQUES FOR MIGRATING ACTIVE I/O CONNECTIONS WITH MIGRATING SERVERS AND CLIENTS," by Julianne F. Haugh et al., filed on Aug. 31, 2010 (now abandoned). The disclosure of U.S. patent application Ser. No. 13/450,633 is incorporated herein by reference in its entirety for all purposes.

BACKGROUND

This disclosure relates generally to migrating active input/output (I/O) connections and, more particularly to techniques for migrating active I/O connections with migrating virtualized I/O servers and/or I/O clients.

InfiniBand (IB) is a switched fabric communications link that has been employed in high performance computing (HPC) applications. Similar to Fibre channel (FC), peripheral component interconnect (PCI) express, and serial advanced technology attachment (ATA), as well as other modern interconnects, IB offers point-to-point bidirectional serial links for connecting processors with high-speed peripherals, e.g., disks. Today, FC is widely used as the standard connection type for storage area networks (SANs). FC protocol (FCP) is a transport protocol (similar to transmission control protocol (TCP) used in Internet protocol (IP) networks) that predominantly transports small computer system interface (SCSI) commands over FC networks. FC supports a number of upper layer protocols, including SCSI, asynchronous transfer mode (ATM), and IP. The SCSI standards define commands, protocols, and electrical and optical interfaces. SCSI is most commonly used for hard disks and tape drives, but can connect a wide range of other devices, e.g., scanners and compact disc (CD) drives.

Unlike FC, which has traditionally required special-purpose cabling, Internet SCSI (iSCSI) can be run over relatively long distances using many existing network infrastructures. iSCSI is an IP-based storage networking standard for linking data storage facilities. iSCSI can be used to transmit data over local area networks (LANs), wide area networks (WANs), or the Internet and facilitates location-independent data storage and retrieval. iSCSI is a popular SAN protocol that allows organizations to consolidate storage into data center storage arrays, while providing hosts (such as database and web servers) with the illusion of locally-attached disks. A SAN architecture is typically used to attach remote computer storage devices (e.g., disk arrays, tape libraries, and optical jukeboxes) to servers in such a way that the devices appear locally attached, with respect to an operating system (OS). A SAN only provides block-level operations, as contrasted with file abstraction. However, file systems may be built on top of SANs to provide file abstraction. In contrast to SANs, network attached storage (NAS) uses file-based protocols, where it is clear that the storage is remote and computers request a portion of an abstract file rather than a disk block. NAS provides both storage and a file system, in contrast to SANs, which typically provide only block-based storage and leave file system concerns to the client-side. Protocols employed in SANs include SCSI, FC, iSCSI, advanced technology attachment (ATA), and ATA over Ethernet (AoE), among other protocols. Despite their differences, SANs and NAS are not mutually exclusive, and may be combined, offering both file-level protocols and block-level protocols from the same system.

I/O virtualization is a methodology that is typically implemented to simplify management, lower costs, and improve performance of servers. I/O virtualization environments are created by abstracting upper layer protocols from physical connections. I/O virtualization enables one physical adapter card to appear as multiple virtual network interface cards (vNICs) and virtual host bus adapters (vHBAs). vNICs and vHBAs function as conventional NICs and HBAs and are designed to be compatible with existing OSs, hypervisors, and applications. To networking resources (e.g., LANs and SANs), the vNICs and vHBAs appear as normal cards and adapters. Virtual I/O provides a shared transport for all network and storage connections. Virtual I/O addresses performance bottlenecks by consolidating I/O to a single connection, whose bandwidth ideally exceeds the I/O capacity of an associated server (to ensure that an associated I/O link is not a bottleneck). Bandwidth is then dynamically allocated in real-time across multiple virtual connections to both storage and network resources. In I/O intensive applications, I/O virtualization can help increase both virtual machine (VM) performance and the number of VMs that may execute on a given server.

Storage virtualization refers to the process of abstracting logical storage from physical storage. In general, physical storage resources are aggregated into storage pools, from which logical storage is created. Storage virtualization presents a logical space for data storage and transparently handles the process of mapping the logical space to the actual physical location. Storage virtualization is typically implemented in modern disk arrays using vendor proprietary solutions. However, the goal of storage virtualization is usually to virtualize multiple disk arrays from different vendors, scattered over a network, into a single monolithic storage device, which can be managed uniformly.

File systems, which are the most common means of accessing disk storage, are abstractions of a physical storage object (e.g., rotating magnetic media, solid state electronic devices, directory structured magnetic tapes) into a more human friendly format, where data can be organized into files, folders and other similar objects. Many modern OSs, including those derived from the UNIX or Windows OSs, abstract the final connection between the file system into, for example, a device switch, a device array, or a device control block. Each physical device, as well as each type of physical device (which may also include network connected storage, virtualized disk storage, etc.) has a different handle, identifier, or other type of object. These data structures or objects include the information needed by the OS or disk I/O subsystem to convert requests for disk I/O into actual data transfer (i.e., either reading or writing).

SUMMARY

According to one aspect of the present disclosure, a technique for modifying an input/output (I/O) connection type between a client and a server includes determining, by the client, when at least partial storage access control for the client is to be migrated from a first virtualized I/O server to a second virtualized I/O server. An I/O connection type, from among multiple available I/O connection types available between the client and the second virtualized I/O server, is then selected by the client, when the at least partial storage access control for the client is to be migrated. The selected I/O connection type is then communicated, by the client, to the second virtualized I/O server, which is configured to facilitate storage access for the client using the selected I/O connection type.

BRIEF DESCRIPTION OF THE DRAWINGS

The present invention is illustrated by way of example and is not intended to be limited by the accompanying figures, in which like references indicate similar elements. Elements in the figures are illustrated for simplicity and clarity and have not necessarily been drawn to scale.

DETAILED DESCRIPTION

Figure 1:
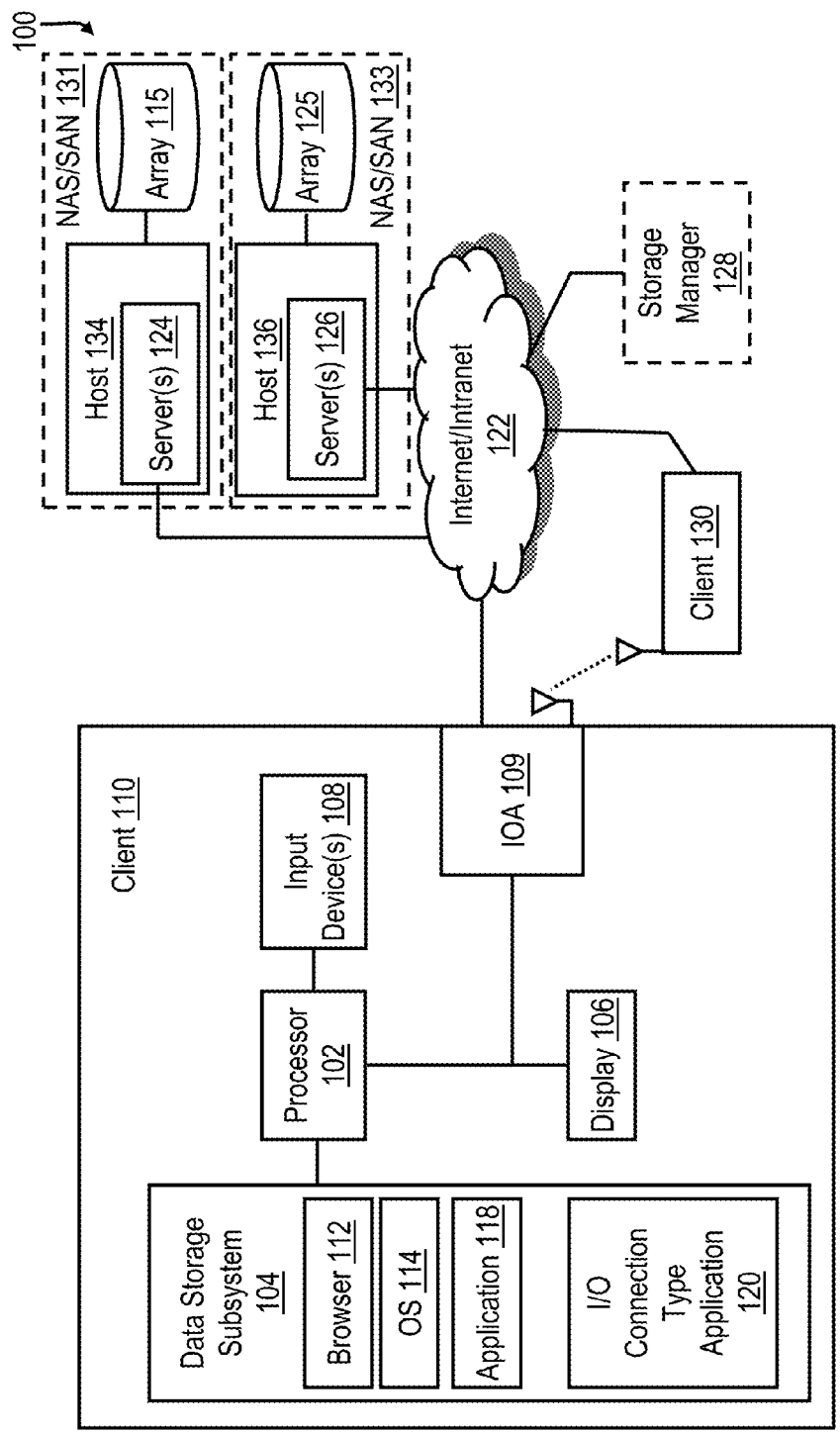
FIG. 1 is a block diagram of an example data processing environment that may be configured to migrate active input/output (I/O) connections according to various aspects of the present disclosure.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. As may be used herein, the term "coupled" includes both a direct electrical connection between blocks or components and an indirect electrical connection between blocks or components achieved using one or more intervening blocks or components.

When virtualized input/output (I/O) servers, logical partitions, network attached storage (NAS), and/or storage area network (SAN) devices are migrated opportunities for improving I/O connections may exist when, for example, a new physical location of an I/O client is closer to a new physical location of a migrated virtualized I/O server. According to various embodiments of the present disclosure, each time an I/O client (e.g., a disk I/O client) or a virtualized I/O server (e.g., a virtualized disk I/O server) is migrated, related endpoints (i.e., a server in the case of a client migrating or a client in the case of a server migrating) may determine the network topology of each connection, as well as available I/O connection types.

For example, a client may query an I/O server as to which I/O connection types are possible given an Internet protocol (IP) address. Based on the connection types available, client and server data structures may be modified to, for example, select the most efficient (e.g., in terms of data transfer speed) I/O connection type available. In one embodiment, disk I/O requests are suspended pending the I/O connection type modification (which may be an upgrade or a downgrade in the I/O connection type), with the I/O connection type modification being considered both prior to migration and once migration is complete. For some I/O connection changes (e.g., local to network), it may be desirable to complete the I/O connection type change prior to migration. For other I/O connection type changes (e.g., network to local), it may be desirable to complete the I/O connection type change following migration. In any case, following disk I/O connection migration, disk I/O may resume on a connection-by-connection basis.

According to another aspect of the present disclosure, a new I/O connection may be established between a new virtualized I/O server and an I/O client, while an old I/O connection between the I/O client and an old virtualized I/O server is maintained. In this case, following migration initiation, new I/Os are sent to the new virtualized I/O server, while the old virtualized I/O server completes service of the old I/Os. When the old virtualized I/O server finishes servicing the old I/Os, the old I/O connection is closed. In this manner, I/O access downtime is reduced (and possibly eliminated) and rebooting of the I/O client is avoided.

According to various aspects of the present disclosure, an I/O connection may be upgraded or downgraded when an endpoint (server or client) is moved from its origin. In a typical situation, migration of an endpoint, (either a client or a server) results in either a network connection (e.g., an IP address of an iSCSI device changes) or a physical I/O connection (e.g., an available adapter changes from: FC to SCSI; FC to iSCSI; FC to IB; IB to FC; IB to SCSI; IB to iSCSI; iSCSI to SCSI) being changed. For example, a network connection might be changed by migrating a virtual I/O server to a different virtual host (which is not local to a previous connection, or which becomes local to the previous connection). Each type of change may result in a physical type I/O connection being changed (e.g., I/O connections where physical blocks are specified, rather than logical connections where the physical I/O structure is concealed, such as with network file system (NFS), common Internet file system (CIFS), and similar mechanisms). For example, an I/O connection type may change from iSCSI to SCSI or from one network file system type (e.g., network attached storage (NAS), SAN, or other block-structured I/O mechanism) to another, as a result of an I/O server being migrated.

A number of patents disclose migrating files or storage. For example, U.S. Pat. No. 7,219,096 (hereinafter "the '096 patent") discloses a method for migrating files on a busy file system, with the migrated files being recreated on a different file system. However, the '096 patent does not address the case where there is no desire to break a client/server connection, but rather to change characteristics of the connection to one which is more efficient (if possible), or less efficient (if required to maintain the client/server connection). As another example, U.S. Pat. No. 6,976,103 (hereinafter "the '103 patent") discloses a method for migrating storage. However, the '103 patent does not address modifying a connection type when a virtualized I/O server (or network disk I/O service) is migrated.

As yet another example, U.S. Pat. No. 6,931,441 (hereinafter "the '441 patent") discloses a method for migrating an actual network connection by means of an encapsulating mechanism. In the '441 patent, network communication is made between capsules, with the capsules handling changes in network addressing. However, the '441 patent does not address migrating the physical connection between a disk I/O client and a virtualized disk I/O server. While migration as disclosed in the '441 patent may include changing a network address, the network address change is handled by changing the underlying abstracted block device interface, or other such mechanism. As an example, if a client moved from IP address 192.168.1.12 to IP address 192.168.0.7 and the client is now located within a virtual host that also contains an associated disk I/O server (e.g., at IP address 192.168.0.2), following the disclosure of the '441 patent, packet routing would be changed without upgrading the I/O connection. While some performance benefit may result from changing the network transport (e.g., a virtual network where traffic on the 192.168.0/24 subnet was not transmitted over physical connections, as with products such as VMware and others), greater benefits are usually provided by removing the software layer which abstracts the physical connection into a network protocol (according to one or more embodiments of the present disclosure).

With reference to FIG. 1, an example data processing environment 100 is illustrated that includes a client 110 and a client 130 that are configured to select (or at least participate in the selection of) an I/O connection type when an associated virtualized I/O server is migrated (e.g., created in a different virtual host) and/or when clients 110 and 130 are re-located (when, for example, clients 110 and 130 are mobile devices). Clients 110 and 130 may take various forms, such as workstations, laptop computer systems, notebook computer systems, smart phones, web-enabled portable devices, or desktop computer systems. For example, client 110 may correspond to a desktop computer system of a computer system user and client 130 may correspond to a web-enabled device of another computer system user.

Client 110 includes a processor 102 (which may include one or more processor cores for executing program code) coupled to a data storage subsystem 104, a display 106, one or more input devices 108, and an input/output adapter (IOA) 109. IOA 109 may be virtualized as: a Fibre Channel (FC) adpater, a small computer system interface (SCSI) adapter, an Internet SCSI (iSCSI) adapter, or an InfiniBand (IB) adapter, among other adapters. Data storage subsystem 104 may include, for example, an application appropriate amount of volatile memory (e.g., dynamic random access memory (DRAM)), non-volatile memory (e.g., read-only memory (ROM) or static RAM), and/or non-volatile mass storage device, such as a magnetic or optical disk drive. Data storage subsystem 104 includes an operating system (OS) 114 for client 110, as well as application programs, such as a browser 112 (which may optionally include customized plug-ins to support various client applications), application 118 (which may include an email application, a word processing application, etc.), and an I/O connection type application 120. I/O connection type application 120, when executed by clients 110 and 130, is configured to interact with a virtualized I/O server (e.g., servers 124 or 126) to determine what I/O connection types are available when clients 110 and 130 are migrated and/or an associated virtualized I/O server (e.g., servers 126 or 124) is migrated.

Display 106 may be, for example, a cathode ray tube (CRT) or a liquid crystal display (LCD). Input device(s) 108 of client 110 may include, for example, a mouse, a keyboard, haptic devices, and/or a touch screen. IOA 109 supports communication of client 110 with one or more wired and/or wireless networks utilizing one or more communication protocols, such as 802.x, HTTP, simple mail transfer protocol (SMTP), etc. IOA 109 also facilitates communication between clients 110 and 130 and may physically correspond to, for example, an FC adapter, an IB adapter, an SCSI adapter, or an iSCSI adapter, among other adapters.

Clients 110 and 130 are coupled via one or more wired or wireless networks, such as Internet/intranet 122, to optional storage manager 128 (which may be a SAN manager) and hosts 134 and/or 136 and respective virtualized I/O servers 124 and 126. Virtualized I/O servers 124 and 126 provide respective access to data stored on disk arrays 115 and 125. Hosts 124 and 126 may be physically located in, for example, a same room of a building, a different room of a building, a different building in a limited geographical area, or a different geographical area (e.g., different cites, counties, states, or countries). As one example, virtualized I/O servers 124 and 126 may each represent six virtualized I/O servers.

It should be appreciated that hosts 134 and 136 may each implement more or less than six virtualized I/O servers and a virtual machine manager (VMM) or hypervisor for controlling operation of the virtualized I/O servers (which may each utilize the same or a different OS), as well as an I/O connection type application that, when executed by hosts 134 and 136, facilitates communication with client 110 and 130 to determine what I/O connection types are available following migration of clients 110 and 130 and/or an associated virtualized I/O server (e.g., servers 126 or 124). While only two clients and two hosts (i.e., physical platforms) are shown associated with data processing environment 100, it should be appreciated that more or less than two clients and more or less than two hosts may be implemented in a data processing environment configured according to the present disclosure. Host 134 and array 115 may be included within a NAS or SAN (NAS/SAN) 131. Similarly, host 136 and array 125 may be included within a different NAS or SAN (NAS/SAN) 133. Arrays 115 and 125 may each correspond to, for example, redundant array of inexpensive disks (RAID) arrays.

Figure 2:
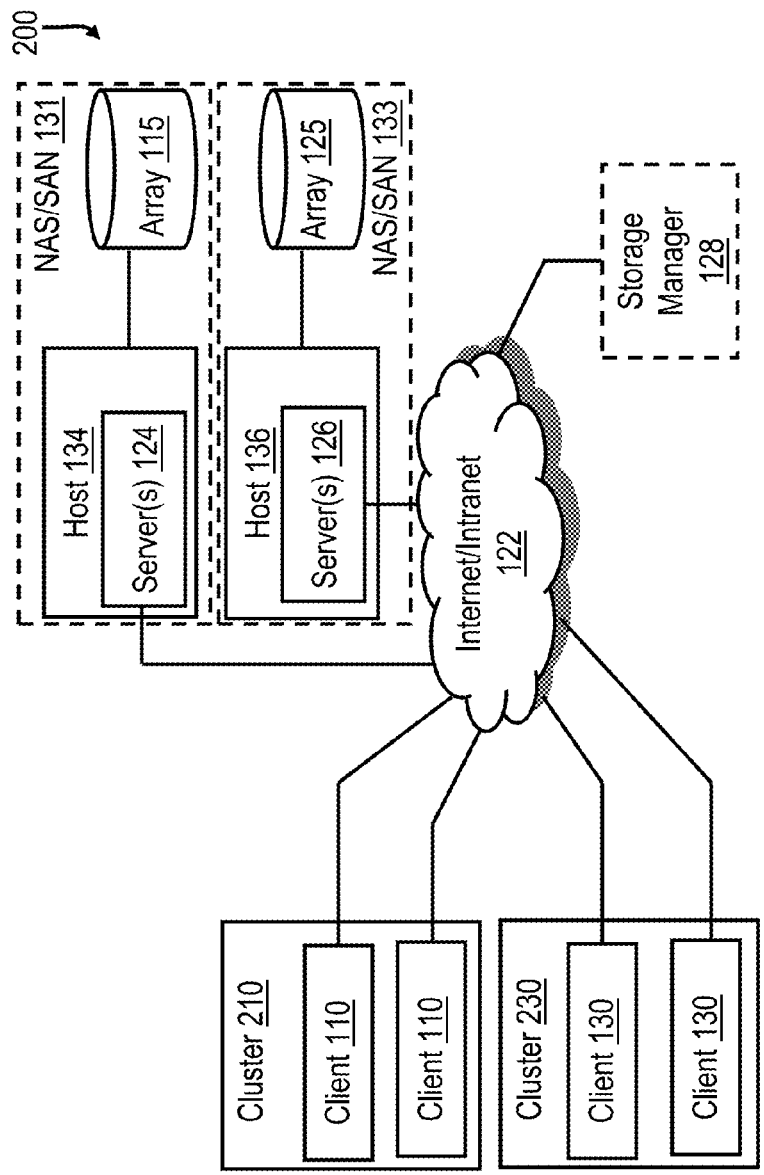
FIG. 2 is a block diagram of another example data processing environment that may be configured to migrate active I/O connections according to various embodiments of the present disclosure.

With reference to FIG. 2, an example data processing environment 200 is illustrated that includes a client cluster 210 that includes multiple clients 110 and a client cluster 230 that includes multiple clients 130. Clients 110 and 130 are configured to select an I/O connection type when an associated virtualized I/O server is migrated (e.g., to a different virtual host) and/or when clients 110 and 130 are re-located (when, for example, clients 110 and 130 are mobile devices). Clients 110 and 130 are coupled via one or more wired or wireless networks, such as Internet/intranet 122, to optional storage manager 128 (which may be, for example, a SAN manager) and hosts 134 and/or 136 and respective virtualized I/O servers 124 and 126. As with the data processing environment 100 of FIG. 1, virtualized I/O servers 124 and 126 provide access to data stored on respective disk arrays 115 and 125. For example, virtualized I/O servers 124 and 126 may each represent one or more virtualized I/O servers.

It should be appreciated that hosts 134 and 136 may each implement more than one virtualized I/O server and a virtual machine manager (VMM) or hypervisor for managing operation of implemented virtualized I/O servers. While only two client clusters are shown associated with data processing environment 200, it should be appreciated that more or less than two client clusters may be associated with a data processing environment configured according to the present disclosure. In any case, when a virtualized I/O server that is servicing a client cluster is migrated, clients within a client cluster may coordinate between themselves and/or between the clients and the migrated (new) virtualized I/O server to determine what I/O connection type each of the clients may implement. For example, clients in a client cluster may implement different I/O connection types to balance a load on an associated virtualized I/O server.

Figure 3:
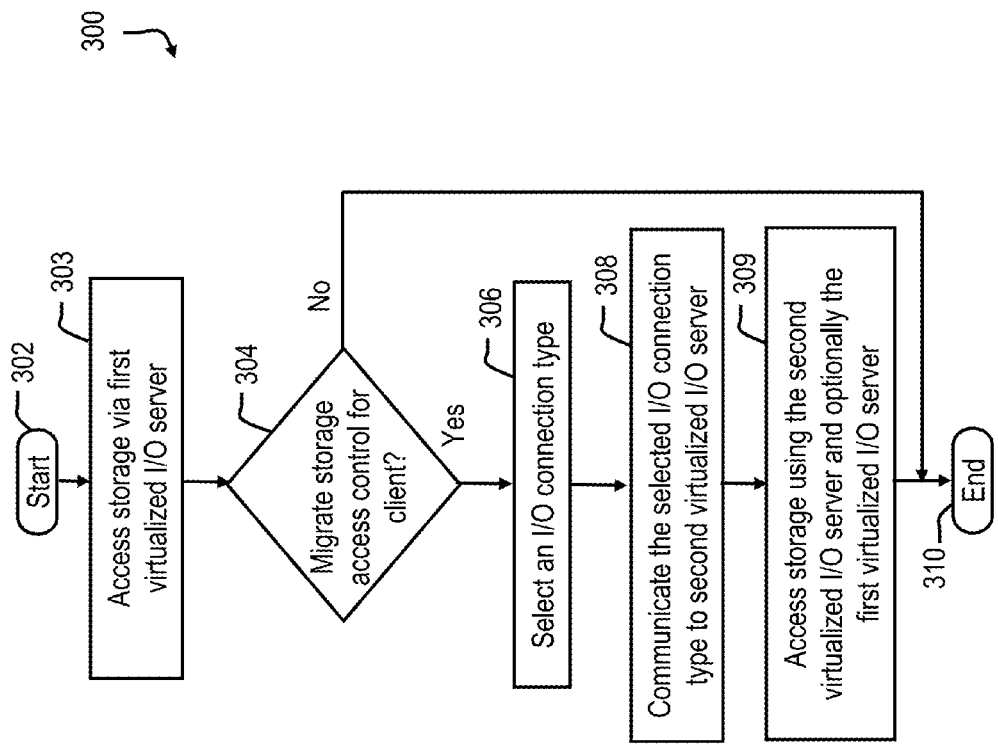
FIG. 3 is a flowchart of an example process for migrating an active I/O connection for a client according to various aspects of the present disclosure.

With reference to FIG. 3, an example process 300 is illustrated that migrates active I/O connection types of a client according to various aspects of the present disclosure. It should be appreciated that portions of process 300 may execute, at any given point in time, on clients 110 or 130, hosts 134 or 136, optional storage manager 128, or a combination thereof. Process 300 may be periodically initiated at block 302 by, for example, storage manager 128, which may be implemented as a stand-alone application on a dedicated server or on hosts 134 and 136. In block 303, client 110 accesses storage via an old (first) virtualized I/O server. Process 300 then proceeds to decision block 304, where client 110 (alone or in conjunction with, for example, storage manager 128) determines whether at least partial storage access control requires migration (e.g., due to an addition of an upgraded host (which may be included in a SAN or NAS) or maintenance on a current host and/or a disk array associated therewith). When migration is not indicated in block 304, control transfers to block 310, where process 300 terminates and control returns to a calling routine.

When migration is indicated in block 304, control transfers to block 306, where client 110 (alone or in conjunction with, for example, a new (second) virtualized I/O server) selects an I/O connection type for the connection between client 110 and the new virtualized I/O server. The selected I/O connection type may be the same or different than the I/O connection type employed between the client and the old virtualized I/O server. The new virtualized I/O server may correspond to, for example, a replica of the old virtualized I/O server. In this case, both the new and old virtualized servers may facilitate storage access for the client. The first and second virtualized I/O servers may be, for example, located in a same storage area network (SAN). In one or more embodiments, each client selects its own I/O connection type. In another embodiment, the new virtualized I/O server selects (alone or in combination with, for example, storage manager 128) an I/O connection type for each client. The new virtualized I/O server may be, for example, a replica of the old virtualized I/O server that is migrated to a new virtual host.

As one example, the I/O connection type may be selected based on testing (by a client) each of the multiple available I/O connection types to determine a performance level of each of the multiple available I/O connection types. In this case, the I/O connection type may be selected (by a client), for example, based on which of the multiple available I/O connection types has a highest performance level and allows a connection between the client and the new virtualized I/O server to be maintained. Next, in block 308, client 110 communicates the selected I/O connection type to the new virtualized I/O server. Then, in block 309, client 110 accesses storage using the new virtualized I/O server and optionally the old virtualized I/O server. Following block 309, control transfers to block 310, where process 300 terminates and control returns to a calling routine.

Figure 4:
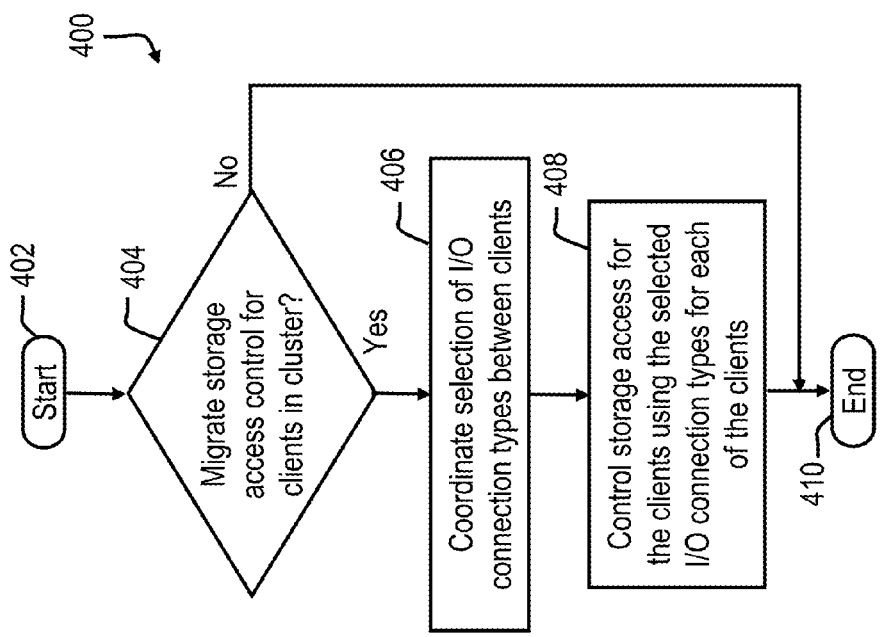
FIG. 4 is a flowchart of an example process for migrating active I/O connections for clients in a client cluster according to various aspects of the present disclosure.

With reference to FIG. 4, an example process 400 is illustrated that migrates active I/O connection types of clients in a client cluster according to various aspects of the present disclosure. It should be appreciated that portions of process 400 may execute, at any given point in time, on clients 110 or 130, hosts 134 or 136, optional storage manager 128, or a combination thereof. Process 400 may be periodically initiated at block 402 by, for example, storage manager 128, which may be implemented as a stand-alone application on a dedicated server or on hosts 134 and 136. Process 400 then proceeds to decision block 404, where client 110 (alone or in conjunction with, for example, storage manager 128) determines whether at least partial storage access control requires migration (e.g., due to an addition of an upgraded host (which may be included in a SAN or NAS) or maintenance on a current host and/or a disk array associated therewith). When migration is not indicated in block 404, control transfers to block 410, where process 400 terminates and control returns to a calling routine.

When migration is indicated in block 404, control transfers to block 406, where each of the clients, in a client cluster, selects in conjunction with other clients in the client cluster and/or in conjunction with a new (second) virtualized I/O server) an I/O connection type. In this case, at least some of the clients in the client cluster may need to select a less efficient I/O connection type than is available in order to ensure that the new virtualized I/O server can meet I/O demands of all of the clients in the client cluster. The new virtualized I/O server may correspond to, for example, a replica of the old virtualized I/O server. In this case, both the new and old virtualized servers may control storage access for the clients. The first and second virtualized I/O servers may be, for example, located in a same storage area network (SAN). The new virtualized I/O server may, for example, correspond to a replica of the old virtualized I/O server migrated to a new virtual host.

As one example, when a client cluster includes six clients, an I/O link may be limited such that only two I/O connection types can be IB, two I/O connections types are required to be SCSI, and two connection types are required to be iSCSI. As another example, the I/O connection type may be selected based on testing (by a client) each of the multiple available I/O connection types to determine a performance level of each of the multiple available I/O connection types. In this case, the I/O connection type may be selected (by a client in conjunction with other clients), for example, based on which of the multiple available I/O connection types provides a highest performance level and allows a connection between the client and the new virtualized I/O server to be maintained. Next, in block 408, the virtualized I/O server controls storage access for each client using selected I/O connection types. As mentioned above, storage access control for at least some clients in a client cluster may remain under control of the first virtualized I/O server to substantially balance a load for the client cluster between the first and second virtualized I/O servers. Following block 408, control transfers to block 410, where process 400 terminates and control returns to a calling routine.

Accordingly, techniques have been disclosed herein that select an I/O connection type to maximize data transfer efficiency (between a disk storage client and a disk storage I/O server) when either the client or the I/O server are migrated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the app ended claims.

What is claimed is:

1. A computer program product, comprising:
a computer-readable storage device; and
computer-readable code embodied on the computer-readable storage device, wherein the computer-readable code, when executed by a client, causes the client to:
determine when at least partial storage access control for the client is to be migrated from a first virtualized I/O server to a second virtualized I/O server;
select an I/O connection type from among multiple available I/O connection types available between the client and the second virtualized I/O server when the at least partial storage access control for the client is to be migrated; and communicate the selected I/O connection type to the second virtualized I/O server, wherein the second virtualized I/O server is configured to facilitate storage access for the client using the selected I/O connection type.

2. The computer program product of claim 1, wherein the second virtualized I/O server is a replica of the first virtualized I/O server and the computer-readable code, when executed by the client, further causes the client to:

access storage via both the first and second virtualized I/O servers.

3. The computer program product of claim 1, wherein the second virtualized I/O server resides on a different virtual host than the first virtualized I/O server and the second virtualized I/O server is further configured to facilitate storage access for the client during and following migration of the at least partial storage access control from the first virtualized I/O server to the second virtualized I/O server.

4. The computer program product of claim 1, wherein the client includes a cluster of clients and each of the clients in the cluster is configured to select respective I/O connection types in conjunction with the other clients to balance a load on the second virtualized I/O server, and wherein the I/O connection types include a Fibre Channel connection, a small computer system interface (SCSI) connection, an Internet SCSI connection, and an InfiniBand connection.

5. The computer program product of claim 1, wherein the first and second virtualized I/O servers are located in a same storage area network and the second virtualized I/O server is further configured to facilitate storage access for the client following migration of the at least partial storage access control from the first virtualized I/O server to the second virtualized I/O server.

6. The computer program product of claim 1, wherein the computer-readable code, when executed by the client, further causes the client to:

test each of the multiple available I/O connection types to determine a performance level of each of the multiple available I/O connection types; and select the I/O connection type based on which of the multiple available I/O connection types yields a highest performance level, as indicated by the testing, and allows a connection between the client and the second virtualized I/O server to be maintained.

7. The computer program product of claim 1, wherein the client is included in a client cluster that includes at least one other client and storage access control for the at least one other client remains under control of the first virtualized I/O server to substantially balance a load for the client cluster between the first and second virtualized I/O servers, and wherein the client queries the second virtualized I/O server to determine the multiple available I/O connection types, where I/O connection types for clients in the client cluster may be the same or different.

8. A data processing system, comprising:

a first virtualized I/O server configured to facilitate storage access control;

a client configured to select an I/O connection type, from among multiple available I/O connection types, when at least partial storage access control for the client is migrated from the first virtualized I/O server; and a second virtualized I/O server configured to transmit the multiple available I/O connection types to the client in response to a query from the client, wherein the second virtualized I/O server is further configured to facilitate storage access control for the client during and following migration of the at least partial storage access control from the first virtualized I/O server to the second virtualized I/O server.

9. The data processing system of claim 8, wherein the client is further configured to test each of the multiple available I/O connection types to determine a performance level of each of the multiple available I/O connection types and select the I/O connection type based on which of the multiple available I/O connection types yields a highest performance level, as indicated by the testing, and allows a connection between the client and the second virtualized I/O server to be maintained.

10. The data processing system of claim 8, wherein the client is included in a client cluster that includes at least one other client and storage access control for the at least one other client remains under control of the first virtualized I/O server to substantially balance a load for the client cluster between the first and second virtualized I/O servers.

11. The data processing system of claim 8, wherein the second virtualized I/O server is a replica of the first virtualized I/O server and the client is configured to access storage via both the first and second virtualized I/O servers.

12. The data processing system of claim 8, wherein the second virtualized I/O server resides on a different virtual host than the first virtualized I/O server.

13. The data processing system of claim 8, wherein the first and second virtualized I/O servers are located in a same storage area network and the second virtualized I/O server is further configured to facilitate storage access for the client following migration of the at least partial storage access control from the first virtualized I/O server to the second virtualized I/O server.

14. The data processing system of claim 8, wherein the client is included in a client cluster that includes at least one other client and storage access control for the at least one other client remains under control of the first virtualized I/O server to substantially balance a load for the client cluster between the first and second virtualized I/O servers, and wherein the client queries the second virtualized I/O server to determine the multiple available I/O connection types, where I/O connection types for clients in the client cluster may be the same or different.

* * * * *